(12) United States Patent
Jahic (10) Patent No.: US 10,724,118 B2
(45) Date of Patent: Jul. 28, 2020

(54) PROCESS FOR OBTAINING COPPER FROM WASTE FISHING NETS

(71) Applicant: AquafilSLO d.o.o., Ljubljana (SI)

(72) Inventor: Denis Jahic, Ljubljana-Smartno (SI)

(73) Assignee: AquafilSLO d.o.o., Ljubljana (SI)

( * ) Notice: Subject to any disclaimer, the term of this patent is extended or adjusted under 35 U.S.C. 154(b) by 0 days.

(21) Appl. No.: 16/471,691

(22) PCT Filed: Dec. 22, 2016

(86) PCT No.: PCT/SI2016/000029
§ 371 (c)(1),
(2) Date: Jun. 20, 2019

(87) PCT Pub. No.: WO2018/117978
PCT Pub. Date: Jun. 28, 2018

(65) Prior Publication Data
US 2019/0316265 A1   Oct. 17, 2019

(51) Int. Cl.
| C22B 15/00 | (2006.01) |
| C25C 1/12 | (2006.01) |
| C22B 7/00 | (2006.01) |
| C09D 5/16 | (2006.01) |

(52) U.S. Cl.
CPC ......... *C22B 15/0067* (2013.01); *C22B 7/007* (2013.01); *C25C 1/12* (2013.01); *C09D 5/1606* (2013.01); *Y02P 10/236* (2015.11)

(58) Field of Classification Search
None
See application file for complete search history.

(56) References Cited

U.S. PATENT DOCUMENTS

| 3,878,071 | A | * | 4/1975 | Selby | C01G 3/00 205/495 |
| 4,314,850 | A | * | 2/1982 | Watanabe | C09D 5/1612 106/15.05 |
| 6,258,245 | B1 | * | 7/2001 | Cifuentes | C22B 3/0005 205/351 |
| 2010/0209381 | A1 | * | 8/2010 | Tanaka | A01N 59/20 424/78.09 |
| 2015/0130107 | A1 | * | 5/2015 | Ke | D01D 1/00 264/140 |
| 2017/0088686 | A1 | * | 3/2017 | Ke | D01F 6/60 |

FOREIGN PATENT DOCUMENTS

CA      2273067 A1   11/2000

OTHER PUBLICATIONS

Floerl et al, Potential environmental risks associated with biofouling management in salmon aquaculture, Aquaculture Environment Interactions, Jul. 2016, vol. 8, pp. 407-417 (Year: 2016).*
Database WPI Week 201576, Thomson Scientific, London GB; AN 2015-70068D XP002771470, & KR 101565540 Kim J C Nov. 3, 2015.
Database WPI Week 201377 Thomson Scientific, London, GB; AN 2013-T32196 XP002771471, & KR 20130116691 A (Seong Y C) Oct. 24, 2013.

* cited by examiner

*Primary Examiner* — Harry D Wilkins, III
(74) *Attorney, Agent, or Firm* — The Watson IP Group, PLC; Jovan N. Jovanovic (57) ABSTRACT

The invention refers to a method for recovering copper from waste fishing nets. The method of the invention includes washing of nets in a washing liquid, wherein an antifouling coating and other impurities are removed from the surface of the nets to a largest extent possible. The washing liquid is water; NaOH can also be added into the water in order to improve the efficiency of washing, such that the NaOH concentration in the water is up to 20%. The suspension of the washing liquid, sludge and other impurities, resulting from the washing step, is led to a separation step. The sludge obtained in the separation step is led to the dissolution step in an acidic medium. A strong mineral acid is selected as the acidic medium, such as $H_2SO_4$, $HNO_3$, HCl, a mixture of strong mineral acids or a mixture of one or several strong mineral acids with $H_2O_2$. Then, the non-dissolved sludge is separated from the solution of copper ions $Cu^{2+}$ in the acidic medium, the solution of copper ions $Cu^{2+}$ in the acidic medium is led to electrolysis, wherein elementary copper having a purity of more than 94% is deposited on the cathode. The non-dissolved residual sludge can be optionally led to thermal treatment to the reactor, where the residual paraffins and co-polymers are removed at a temperature ranging from 500° C. to 900° C. The remaining ash may contain up to 30% by weight of copper compounds based on the weight of the ash, particularly in the form of copper(ll) oxide CuO, less in the form of copper(l) oxide $Cu_2O$ and copper phosphates $Cu(H_2PO_4)_2$, $Na_6Cu_9(PO_4)_8$. This ash is then led to dissolution in the acidic medium and to further steps of the method. The proposed method of the invention improves the method for recycling waste nets, such that not only pure polyamide is obtained from the nets but also elementary copper, which has a double benefit: elementary copper in a sufficiently pure form is a useful raw material, moreover, the quantity of copper in final waste is reduced, consequently a negative impact on the environment is reduced and the cost of waste disposal of the method is reduced as well.

16 Claims, 4 Drawing Sheets

PROCESS FOR OBTAINING COPPER FROM WASTE FISHING NETS

The invention refers to a method for recovering copper from waste fishing nets, preferably from waste fish farming nets.

Surfaces that are permanently immersed in sea water are exposed to rapid degradation due to biofouling. Biofouling or maritime biological buildup is microorganisms, for instance shells, algae that adhere to and accumulate on surfaces. The surfaces thus get degraded and their life span shortened, this is why they are protected prior to use with antifouling coatings that are applied to the surfaces prior to use.

Fishing nets used in fish farms are particularly exposed to biofouling since they are permanently immersed in sea water. The term»nets«will hereinafter be used for all types of nets that are used in water for preventing or directing movement of fish and other sea animals, including the nets used in fishing and fish farming.

Nets are usually made from synthetic polymer fibres, such as Polyamide 6, Polyamide 6.6, PET, PP In fibre production, commercially available additives for the improvement of thermal and UV stability of polymer fibres can be optionally integrated into fibres.

Antifouling coatings applied onto net fibres are preferably copper-based biocides that are primarily in the form of copper oxides (copper(I) oxide $Cu_2O$ and copper(II) oxide (CuO) and also in the form of other copper compounds. The coatings further contain pigments, binders and waxes, particularly paraffin waxes, and film-forming polymer or co-polymer resins. Antifouling coatings preferably contain an EVA co-polymer resin as a binder that makes it possible for the copper compounds to adhere to the net. These antifouling coatings may include up to 30% by weight of copper based on the quantity of the coating.

Methods for recycling waste fishing nets are known from prior art, in which polyamide is obtained by depolymerisation in reactors. In these methods, an antifouling coating with possible cladding represents an undesired impurity that has a negative impact on the depolymerisation method and therefore needs to be removed beforehand. The waste nets are therefore first washed, usually with water, to remove as much antifouling coating and cladding as possible, then depolymerised in reactors by known methods, and pure caprolactam is obtained that is a raw material for polyamide (Naylon-6). Sludge that remains after the washing and a residue in depolymerisation are useless waste in known methods for obtaining nylon and this is why this waste needs to be disposed in compliance with environmental regulations due to the copper content having a negative impact on the environment; this causes additional costs. The sludge resulting from washing contains considerable quantities of copper compounds, for instance 30% by weight based on the quantity of dry matter, primarily in the form of copper(I) oxide $Cu_2O$, less in the form of copper(II) oxide CuO and copper oxychloride $Cu_2Cl(OH)_3$. The solid residue after depolymerisation still contains small quantities of copper compounds. Copper and copper compounds are toxic to the environment; the sludge and the waste from depolymerisation resulting from known methods therefore need to be adequately disposed in compliance with environmental regulations.

The applicant is not acquainted with methods for recovering copper from waste nets coated with copper-based antifouling coatings.

The proposed method of the invention improves the method for recycling waste nets, such that not only pure polyamide is obtained from the nets but also elementary copper, which has a double benefit: elementary copper in a sufficiently pure form is a useful raw material, moreover, the quantity of copper in final waste is reduced, consequently a negative impact on the environment is reduced and the cost of waste disposal is reduced as well.

The method of the invention will be illustrated hereinafter by way of drawings, in which.

The method of the invention for recovering copper from waste nets protected with copper-based antifouling coatings includes the following steps:

A: Washing of nets in a washing liquid, wherein an antifouling coating and other impurities are removed from the surface of the nets to a largest extent possible. The washing liquid contains between 80 to 100% of water and between 0 to 20% of a washing additive for the improvement of washing efficiency. Washing additives are various bases, such as NaOH, KOH. A washing additive is preferably NaOH. The NaOH concentration in water is preferably 2%. Other conventional washing agents can be added to the washing liquid but this is less desirable as possible residues on cleaned nets may cause problems in subsequent depolymerisation.

The washing is preferably carried out by an additional effect of friction.

Prior to washing, the nets are optionally shredded to achieve a better washing effect and better effect in subsequent method steps.

Between 50 to 95% by weight of the antifouling coating is removed from waste nets by washing. The result of washing is a suspension of a washing liquid, sludge and other impurities such as paraffins and co-polymers that are partly present in the sludge and partly float on the surface of the suspension. The sludge contains copper compounds in the form of copper oxides $Cu_2O$ and CuO and copper oxychloride $Cu_2Cl(OH)_3$, possible impurities, and residues of the antifouling coating, especially paraffins and the EVA co-polymer.

A washing effect is improved if NaOH is added to the washing liquid since it hydrolyses co-polymers (EVA) in the antifouling coating, wherewith the binding effect of the co-polymer is eliminated. As a result, more antifouling coating is removed from the nets during the washing. Moreover, since the binding effect of the co-polymer in the antifouling coating is eliminated, more copper compounds get excreted into the sludge as they are no longer trapped in the paraffin and the co-polymer. In this way, almost the total copper present in copper compounds in the sludge is available for being dissolved by an acidic agent that is added in a subsequent step. If NaOH at a concentration of 2% is used in the water-based washing liquid, more than 70% of the antifouling coating can be removed from the net.

The washed nets which still contain between 5 and 50% by weight of the antifouling coating, can be treated by known methods to obtain caprolactam, namely the washed nets are dried and then depolymerised in a reactor.

B: A suspension of the washing liquid, sludge and other impurities, resulting from the washing step, is led to a separation step that is carried out in known ways, preferably by centrifugation.

Paraffins and co-polymers that are more lightweight than the washing liquid and therefore float on the surface can be optionally removed before centrifugation by skimming. Skimmed paraffins and co-polymers are transferred to an incinerator, wherein vapour is obtained that can be used for heating. Of course, skimming can be used also in other known ways of separation.

The separated washing liquid is recirculated into the washing step A. The sludge remaining after the separation contains copper compounds in the form of copper oxides $Cu_2O$ and $CuO$ and copper oxychloride $Cu_2Cl(OH)_3$, an average of approximately ⅓ of the sludge, unseparated washing liquid, approximately up to ⅓ of the sludge, and a rest containing especially impurities accumulated on the nets and residues of the antifouling coating, especially paraffins and EVA co-polymers.

If the washing liquid contains NaOH, the sludge obtained in the separation step is optionally washed with water, if needed, in order to reduce pH, wherein the suspension so obtained is re-subjected to the above-described separation step. The purpose of pH reduction in the sludge is smaller consumption of an acidic medium in the next step of dissolution.

C: The sludge obtained in the separation step B is led to the dissolution step in an acidic medium. The copper compounds in the sludge, where the copper is primarily present in the form of copper oxides ($Cu_2O$ and $CuO$) and copper oxychloride $Cu_2Cl(OH)_3$, are dissolved, thus obtaining a solution with a concentration of copper ions $Cu^{2+}$ in the acidic medium of at least 20 g/L, preferably at least 50 g/L, and undissolved residue.

A strong mineral acid is selected as the acidic medium, such as $H_2SO_4$, $HNO_3$, HCl, a mixture of strong mineral acids or a mixture of one or several strong mineral acids with $H_2O_2$.

Optionally, $H_2O_2$ can be added for the preparation of the acidic medium, the mole ratio being preferably $n(H_2O_2)/n(Cu)=1$. An addition of $H_2O_2$ increases the yield of dissolution of copper ions from the sludge by at least 20%, since $H_2O_2$ contributes to the opening of the structure of the EVA co-polymer, thus allowing the acidic medium to reach the copper in the copper compounds trapped in the co-polymer and to dissolve it. Despite the fact that $H_2O_2$ increases the yield in the dissolution step, its use is not desirable since peroxide is too expensive plus its use in a technological process requires additional safety measures.

Preferably, $H_2SO_4$ in a concentration from and including 0.5 up to and including 4 M, preferably 1 M is used as the acidic medium.

The use of $HNO_3$, HCl and mixtures of these two acids for the acidic medium results in poorer yields, based on the experiments performed.

Table 1 shows process parameters of copper dissolution from a sludge sample obtained by washing with water, by using $H_2SO_4$ and $H_2O_2$.

TABLE 1

| [a]Experiment No. | $H_2SO_4$ Concentration g/L | $H_2SO_4$ Volume mL | Temperature, ° C. | Addition of $H_2O_2$, mL |
|---|---|---|---|---|
| 1 | 100 | 100 | 25 | / |
| 2 | 100 | 130 | 25 | / |
| 3 | 100 | 150 | 25 | / |
| 4 | 100 | 200 | 25 | / |
| 5 | 100 | 250 | 25 | / |
| 6 | 50 | 100 | 25 | / |
| 7 | 200 | 100 | 25 | / |
| 8 | 100 | 130 | 25 | 10 |
| 9 | 100 | 200 | 70 | / |
| [b]10 | 100 | 150 | 25 | / |

[a]Weighted sludge sample: 40 g.
[b]Gradual addition of $H_2SO_4$ (t = 0 h, 2.8 mL; t = 3 h, 2.8 mL; t = 6 h, 2.8 mL).

Figure 1:
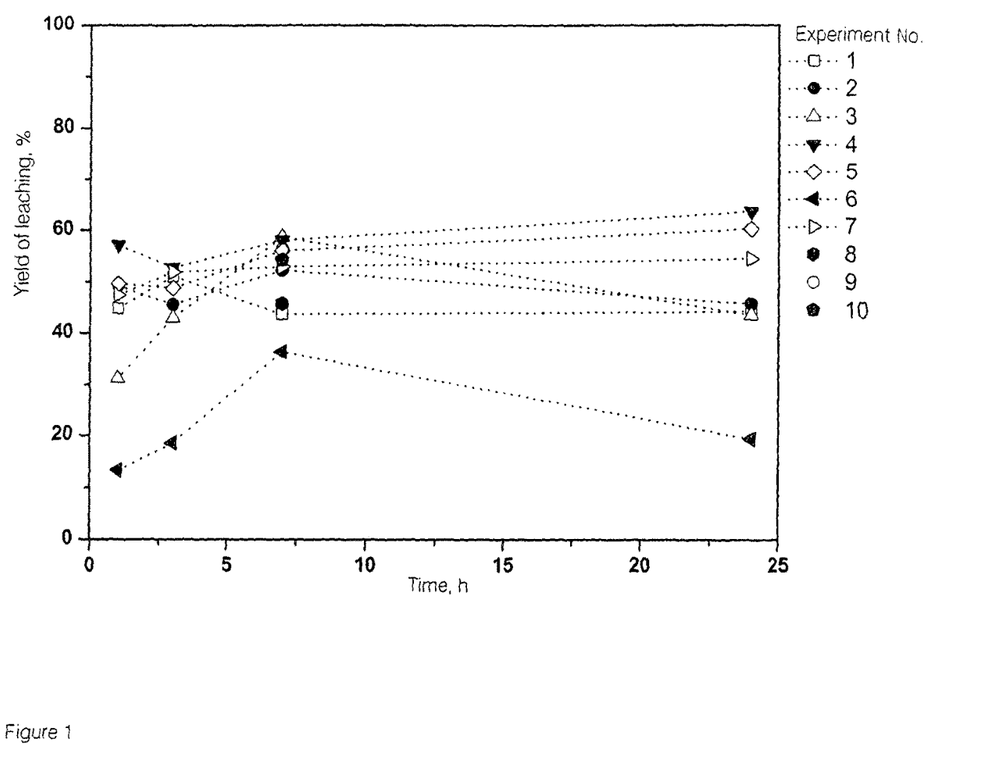
FIG. 1 represents experimental results of yield of copper dissolution as a function of time under process conditions from Table 1

Table 1 and FIG. 1 show experimental results of dissolution of copper from the sludge under various conditions in $H_2SO_4$ and $H_2O_2$. The experiments have shown that the highest yield of dissolution or leaching is obtained by using 200 mL of $H_2SO_4$, the concentration of which amounts to 100 g/L in the processing of 40 g of sludge (Experiment No. 4). The yield of leaching under these conditions barely depends on duration of leaching. An increase in the process temperature does not have any influence on the improvement of the yield of leaching (Experiment No. 4 vs. Experiment No. 9). A three-step addition of $H_2SO_4$ to the suspension in the reactor (t=0 h, t=3 h, t=6 h; $V_{additive}$=2.8 mL $H_2SO_4$) did not bring about any improvement of the method of copper extraction (Experiment No. 3 vs. Experiment No. 10). An addition of $H_2O_2$ after 7 hours of leaching had a negative impact on the leaching yield (Experiment No. 2 vs. Experiment No. 8).

Table 2 shows process parameters of copper dissolution from a sludge sample obtained by washing with water, by using various mineral acids, and by adding $H_2O_2$.

TABLE 2

| [a]Experiment No. | Acid | | | [b]Additive $H_2O_2$ | Temperature, ° C. | Concentration of acid, mol/L |
|---|---|---|---|---|---|---|
| 11 | $H_2SO_4$ | / | / | Da | 25 | 1.0 |
| 12 | / | HCl | / | Ne | 25 | 1.0 |
| 13 | / | HCl | / | Da | 25 | 1.0 |
| 14 | / | / | $HNO_3$ | Da | 25 | 1.0 |
| 15 | / | HCl | $HNO_3$ | Ne | 25 | 11.7 (HCl). 15.8 (HNO$_3$) |
| 16 | / | / | $HNO_3$ | Ne | 25 | 1.0 |

[a]Weighted sludge sample: 40 g
[b]Acid:$H_2O_2$ = 6.6:1.

Figure 2:
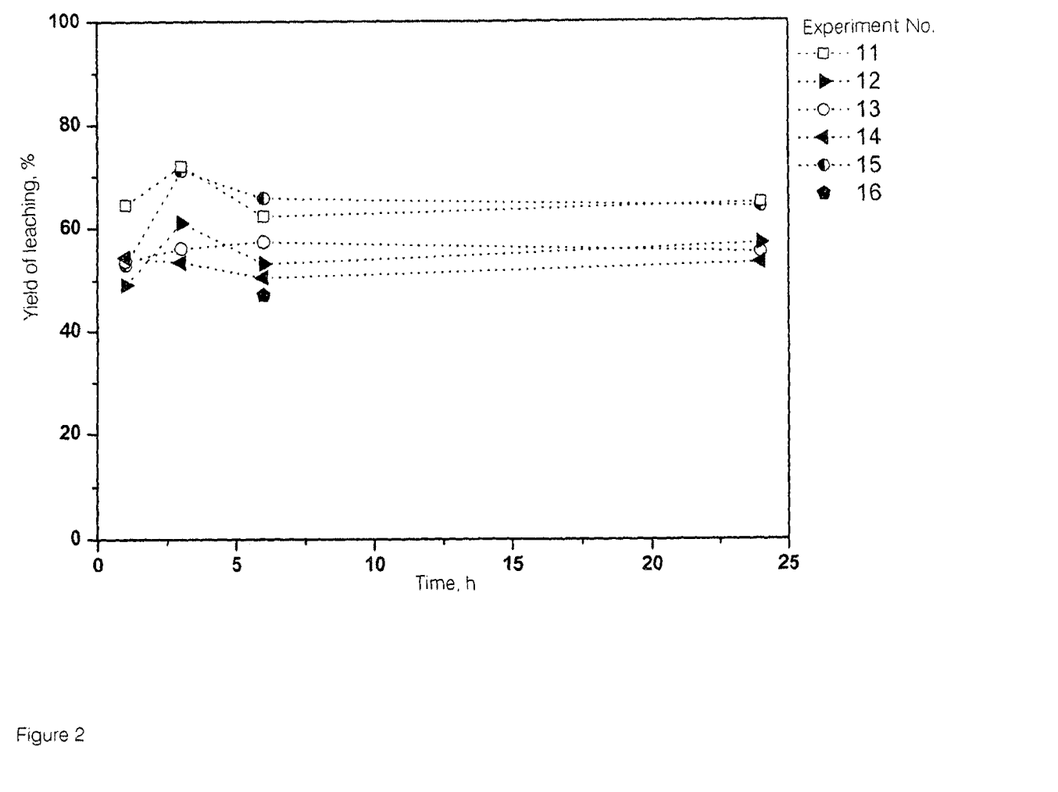
FIG. 2 represents experimental results of yield of copper dissolution as a function of time under process conditions from Table 2

Table 2 and FIG. 2 show experimental results of dissolution of copper from the sludge in $H_2SO_4$, HCl and/or $HNO_3$ and by optionally adding $H_2O_2$ under various conditions. A comparison of leaching of copper from the sludge sample by using the acids $H_2SO_4$, HCl and $HNO_3$ has revealed that under identical process conditions the use of $H_2SO_4$ was the most efficient (Experiment No. 4 vs. Experiment No. 12 vs. Experiment No. 16). An addition of $H_2O_2$ at the beginning of leaching for all used acids results in a higher yield of the leached copper. The most distinctive influence of the additive $H_2O_2$ was identified after 3 hours of leaching, where 72% of copper present in the sludge was leached (Experiment No. 11). A use of the mixture of concentrated HCl and $HNO_3$ (aqua regia, 3:1 v/v) leaches a similar quantity of copper as a combination of 1 M $H_2SO_4+H_2O_2$, Dissolution is carried out at temperatures from including 0° C. to including 100° C., preferably at room temperature under constant stirring.

The yield of dissolution or leaching of copper ions is monitored by measuring the content of dissolved copper or copper ions $Cu^{2+}$ in the solution. Desirably, the yield of dissolution should be at least 50%, since by that the content of copper ions $Cu^{2+}$ in the solution can reach 20 g/L of ions or more, preferably 50 g/L or more. A sufficient content is needed for a successful electrolysis that is carried out in a further step.

The dissolution time of the sludge in the embodiment, where $H_2SO_2$ is used as the acidic medium, ranges from 1 to 4 hours, is preferably 3 hours, wherein the yield of dissolution of copper ions $Cu^{2+}$ is between 50 and at least 95%.

A result of the dissolution step is a solution of copper ions $Cu^{2+}$ in the acidic medium and non-dissolved sludge dispersed in the acidic medium.

D: The next step is separation of the non-dissolved sludge from the solution of copper ions $Cu^{2+}$ in the acidic medium; with the purpose that a solution of copper ions $Cu^{2+}$ in the acidic medium is led into the electrolysis without or with a minimum amount of the non-dissolved sludge. The separation is carried out by settling or centrifugation, preferably by centrifugation.

In order to improve separation, flocculants can be optionally added into the dispersion and they contribute to an easier separation of the non-dissolved sludge from the solution.

Optionally the solution of copper ions $Cu^{2+}$ in the acidic medium is, after the basic separation, filtered with active carbon before electrolysis. The organic substances present that may have a negative impact on the yield of the electrolysis and on the protection of the electrode are thus removed from the solution.

In step D a solution that contains copper ions $Cu^{2+}$ in the acidic medium which is the electrolyte in the next electrolytic step is obtained. The solution contains a concentration of 20 g/L or more copper ions, preferably at least 50 g/L of copper ions.

If the concentration of copper ions $Cu^{2+}$ in the purified solution is not high enough, it may optionally be increased to a sufficient value by using $Cu^{2+}$ ion selective ion exchangers.

E: The solution of copper ions $Cu^{2+}$ in the acidic medium, obtained in step D, then undergoes electrolysis in the electrolytic cell.

A conventional electrolytic cell may be used for the electrolysis, however this is linked to certain drawbacks; due to the cathode and anode in the electrolyte being planar, zones having a smaller content of copper ions are created, which leads to a poorer yield of the electrolysis. When using a conventional electrolytic cell, the initial concentration of copper ions in the solution/electrolyte must be at least 40 g/L.

The electrolytic cell is preferably of a cylindrical shape, which creates a turbulent flow of the electrolyte, which in turn creates an increased mass transfer and prevents creation of zones with low content of copper ions, wherewith the yield of electrolysis is increased. A cylindrical electrolytic cell contains a stainless steel cylinder, the interior surface of which acts as a cathode and in the centre of which there is an anode. In a preferred embodiment of the cylindrical electrolytic cell, the interior part of the cylinder (cathode) is provided with a removable surface, onto which elementary copper is deposited during the electrolysis. The purity of the elementary copper that gets deposited on the cathode of the cylindrical electrolytic cell exceeds 94%, can also exceed 99%.

The antifouling coatings may also include chlorine which is leached from the sludge in the dissolution step; this is why the cathode in the cylindrical electrolytic cell is preferably made from titanium because in this case the chlorine ions present in the solution do not have any influence on the course and yield of the electrolysis. A stainless steel cathode has a shorter life span.

Electrolysis in the cylindrical electrolytic cell is performed at an initial current density of at least 500 A/m², which is gradually reduced to 200 A/m² depending on the quantity of the deposited copper. Economically, the electrolysis should be performed until the concentration of copper ions $Cu^{2+}$ in the solution/electrolyte is higher than 3 g/L. When the concentration of copper ions $Cu^{2+}$ in the solution/electrolyte drops below 3 g/L, the electrolysis is stopped and the elementary copper is recovered from the cathode. Optionally, copper is separated from the remaining solution by electroflotation and disposed in compliance with environmental regulations.

The temperature range, in which electrolysis is performed, is between 0 and 95° C., the electrolysis is preferably performed at room temperature and without additional heating.

To be able to recover useful copper from the non-dissolved residual sludge which remains after the separation in step D and still contains copper compounds, the non-dissolved residual sludge is optionally led to thermal treatment in a reactor, where the residual paraffins and co-polymers are removed at a temperature from 500 to 900° C., preferably 550° C. The remaining ash may contain up to 30% by weight of copper compounds based on the weight of the ash, particularly in the form of copper(II) oxide CuO, less in the form of copper(I) oxide $Cu_2O$ and copper phosphates $Cu(H_2PO_4)_2$, $Na_6Cu_9(PO_4)_8$. This ash is then led to a dissolution step in the acidic medium under conditions as specified above in step C and to further steps of the method (D and E) as indicated above.

Figure 3:
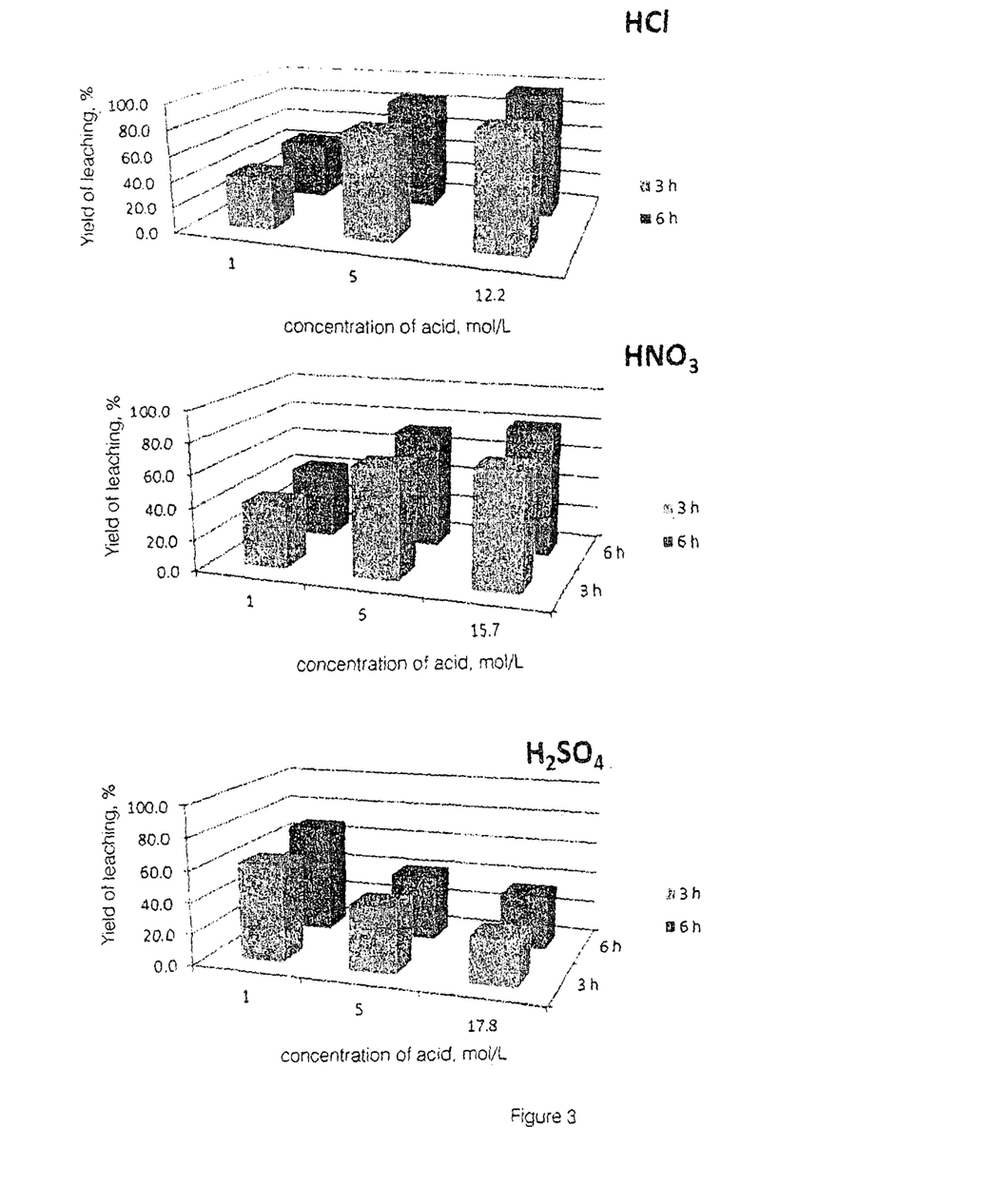
FIG. 3 represents experimental results of yield of copper dissolution from ash with respect to various acids applied

FIG. 3 shows experimental results of yield of copper dissolution from ash with respect to different mineral acids applied, their concentrations and in time dependence. The ash is obtained after the thermal treatment of the residual sludge after the washing nets with water. Conditions of experiments: 2 g of ash, 10 mL of acid, T 25° C.

Figure 4:
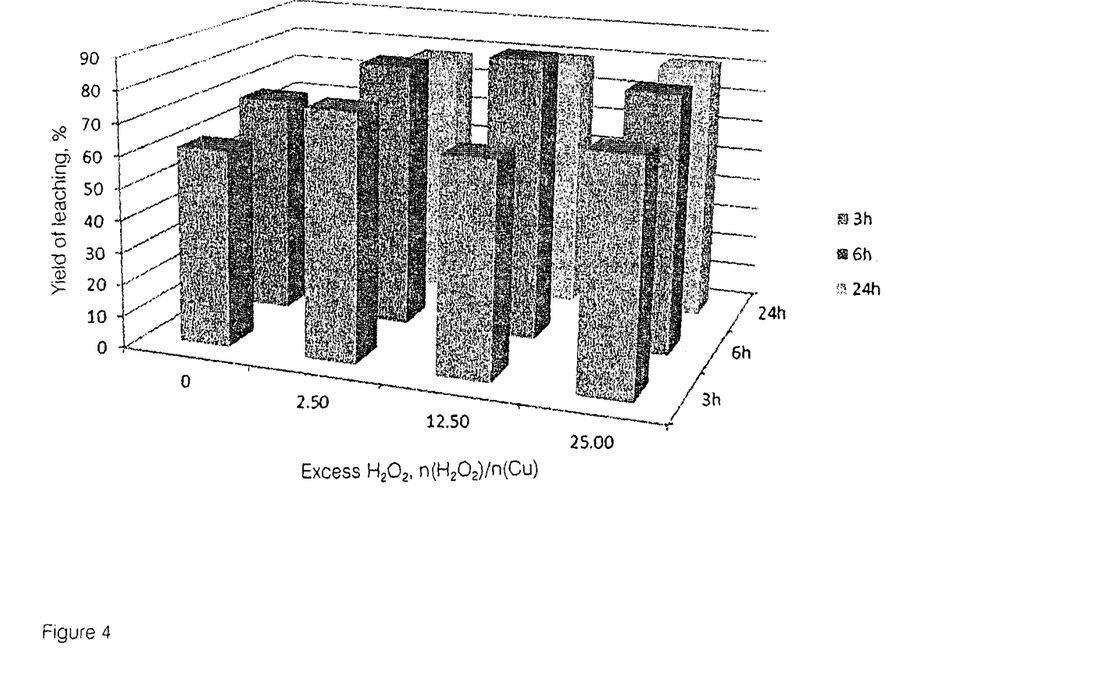
FIG. 4 represents experimental results of yield of copper dissolution from ash as a function of time under a simultaneous application of $H_2SO_4$ and $H_2O_2$.

FIG. 4 represents experimental results of yield of copper dissolution from ash as a function of time under a simultaneous application of $H_2SO_4$ and $H_2O_2$ for various excesses of $H_2O_2$. The ash is obtained after the thermal treatment of the residual sludge after the washing nets with water. Conditions of experiments: 2 g of ash, 25 mL of a solution of 1 M $H_2SO_4$ and $H_2O_2$.

The experiments have shown that the final yield of copper dissolution from the ash is better if HCl is used for the acidic medium, presumably because not the total copper in the form of $Cu_2O$ has oxidized to CuO during thermal treatment. HCl dissolves well both CuO and $Cu_2O$, while $Cu_2O$ is poorly dissolvable in $H_2SO_4$. HCl is less desirable as the acidic medium due to the fact that Cl ions are present in the solution which is then led to the electrolytic cell and these Cl ions prevent a good yield of the electrolysis.

Optionally, the ash, after having been thermally treated, can be added to the sludge from step B and the method then jointly continues according to steps C to E.

Optionally, the washing of nets can be skipped and the waste nets are directly transferred to thermal treatment in the reactor, where all organic substances, i. e. paraffins, copolymers and also synthetic polymers, from which the nets are made, are removed at a temperature ranging from 550° C. to 900° C., preferably 550° C. The nets may optionally be shredded before they are thermally treated in the reactor. The ash resulting from the thermal treatment and containing copper compounds particularly in the form of copper(II) oxide CuO, less in the form of copper(I) oxide $Cu_2O$ and copper phosphates $Cu(H_2PO_4)_2$, $Na_6Cu_9(PO_4)_8$, is then processed according to steps C to E of the method.

The method of the invention will be illustrated hereinafter by embodiments.

FIRST EMBODIMENT

The sludge obtained by washing shredded waste nets with a washing liquid containing only water were centrifuged and filtered. The sludge which remains after centrifugation contains up to 20.4% by weight of copper compounds, wherein copper is primarily in the form of copper oxides ($Cu_2O$ and CuO) and copper oxychloride $Cu_2Cl(OH)_3$, or up to 32.9% by weight of copper compounds based on the dried sludge, 38% by weight of volatile substances (primarily water), the rest being impurities and residual paraffins and EVA co-polymer.

Dissolution of copper from the sludge was carried out in a 250 mL glass batch reactor equipped with a thermostating jacket. The speed of stirring was 200 rpm. 40 g of sludge with the above-indicated content of copper compounds was dissolved in 1M $H_2SO_4$ at room temperature for three hours under constant stirring. 54% of copper present in the sludge was dissolved under the selected conditions.

The non-dissolved sludge was then separated from the solution of copper ions $Cu^{2+}$ by settling of 30 min. The concentration of copper ions $Cu^{2+}$ in the solution was determined by spectrophotometry and amounted to 43 g/L.

SECOND EMBODIMENT

The sludge obtained by washing shredded waste nets with a washing liquid containing only water was centrifuged and filtered. 30 g of sludge (moisture content: 26.8% by weight; copper compound content (based on a dry state): 36.9% by weight) was heated for 3 h in 2 M NaOH (100 mL) at 70° C. under intense stirring. The suspension was then centrifuged, filtered and the copper content in the supernatant was determined. The content of dissolved copper in the supernatant amounted to 0.6 rel. % (with respect to the content of copper in the sludge prior to the treatment with a base). This result confirms that a neglectable quantity of copper gets dissolved during a process of hydrothermal processing of sludge under the selected operating conditions.

The sludge treated by a water solution of NaOH was then washed several times with $H_2O$ (up to pH=10), centrifuged and filtered. The sludge (20 g) treated in this way was further treated with 1 M $H_2SO_4$ (65 mL) at room temperature under intense stirring. The volume of the water solution of $H_2SO_4$ was determined on the basis of dry matter and the actual content of Cu in the sludge sample which was previously treated with a water solution of NaOH. After 3 h of stirring, the content of dissolved copper and dissolved organic carbon, DOC, was measured in the supernatant. 96% of copper present in the sludge was dissolved under the selected conditions. The concentration of dissolved organic carbon (DOC) in the water solution of 1 M $H_2SO_4$ amounted to 1212 ppm of carbon.

THIRD EMBODIMENT

This embodiment describes recovery of copper from a water solution with a concentration of copper ions of 43.0 g/L by using electrolysis method. The composition of this solution is specified in Table 1.

TABLE 1

$^{a,b,c}$Composition of the water solution used for recovering copper by electrolysis method.

| Element | $^d$Concentration, mg/L |
| --- | --- |
| Li | 0.5 |
| B | 2 |
| Al | 57 |
| V | 3 |
| Cr | 0.8 |
| Mn | 3 |
| Fe | 51 |
| Co | 0.1 |
| Ni | 5 |
| Zn | 53 |
| As | 2 |
| Se | 0.2 |
| Mo | 0.7 |
| Ag | 0.2 |
| Cd | 0.3 |
| Sn | 0.9 |
| Sb | 0.2 |
| Pb | 15 |
| S | 22000 |
| P | 1900 |
| Cu | 43000 |

$^a$Copper-ion containing water solution was prepared by the method described in embodiment No. 2. The sludge contained 27.0% by weight of copper compounds.
$^b$pH of the water solution amounts to 0.9.
$^c$Concentration of dissolved chloride ions amounts to 3.8 g/L.
$^d$Determined by semi-quantitative ICP-OES analysis.

The electrolytic process was carried out in a batch laboratory cylindrical electrolytic cell Emew® produced by Electrometals. The copper-ion containing water solution was pumped through a reservoir and the electrolytic cell by means of a centrifugal pump. The volume of the solution, from which copper was separated on the cathode of the cylindrical electrolytic cell, amounted to 3.0 L.

The conditions, under which the electrolytic process was carried out, are specified in Table 2.

TABLE 2

Conditions for carrying out the electrolytic process in the laboratory device emew ®.

| Electrolysis time, h | Temperature of the solution, ° C. | Current density, A/m² | Final copper concentration in the solution, g/L | Purity of copper deposited on the cathode wt. % |
|---|---|---|---|---|
| 1.00 | 22 | 500 | 33.0 | 98.6 |
| 4.00 | 28 | 500 | 11.5 | 97.7 |
| 6.75 | 30 | 175 | 4.0 | 99.2 |

By using the electrolytic process, more than 90% of dissolved copper ions were separated from the water solution under the selected conditions (time, temperature, current density). The purity of copper deposited on the cathode was determined by a SEM-EDX microscopic technique. The purity was high and was in each phase of the electrolytic process in the range from 97.7 to over 99% by weight. A difference to 100% is contributed to copper oxide, the formation of which takes place due to passivation of the surface during the copper coating being exposed to air atmosphere.

The invention claimed is:

1. A method for recovering copper from waste nets protected by copper-based antifouling coatings, the method comprising:
    washing of the waste nets in a washing liquid containing between 80 to 100% of water and between 0 to 20% of a washing additive, wherein a result of the washing is a suspension of a washing liquid, a first sludge and other impurities, wherein the first sludge contains copper compounds in the form of $Cu_2O$, $CuO$ and $Cu_2Cl(OH)_3$, impurities and rests of the antifouling coating;
    separation of the first sludge from the suspension obtained from the washing of the waste nets in the washing liquid, wherein the first sludge, after the separation, comprises:
        copper compounds in the form of copper oxides $Cu_2O$ and $CuO$ and copper oxychloride $Cu_2Cl(OH)_3$,
        unseparated washing liquid, and
        a rest containing impurities accumulated on the waste nets and residues of the antifouling coating;
    dissolution of the first sludge in an acidic medium at temperatures ranging from 0 to 100° C. for 1 to 4 hours, wherein the acidic medium is a strong mineral acid, a mixture of strong mineral acids or a mixture of one or several strong mineral acids with $H_2O_2$, where the copper compounds contained in the first sludge get dissolved, wherewith a solution of copper ions $Cu^{2+}$ and a non-dissolved residual second sludge is obtained, wherein the concentration of copper ions $Cu^{2+}$ in the solution amounts to at least 20 g/L;
    separation of the non-dissolved residual second sludge from the solution, wherewith a solution of $Cu^{2+}$ ions in the acidic medium is obtained, said medium representing an electrolyte that is then led to an electrolytic cell; and
    electrolysis of the solution of copper ions $Cu^{2+}$ in the acidic medium, obtained in the separation of the non-dissolved residual second sludge from the solution, in the electrolytic cell, where elementary copper gets deposited on the cathode.

2. The method according to claim 1, wherein the non-dissolved residual second sludge which remains after the separation of the non-dissolved residual second sludge from the solution is thermally treatment treated in a reactor, where residual paraffins and co-polymers are removed at temperature ranging from 500 to 900° C., and wherewith a first ash is obtained that contains up to 30% by weight of copper compounds in the form of copper(II) oxide CuO, of copper (I) oxide $Cu_2O$ and copper phosphates $Cu(H_2PO_4)_2$, $Na_6Cu_9(PO_4)_8$ calculated based on the weight of the ash, the ash then being dissolved in the acidic medium under the conditions specified in the dissolution of the first sludge in the acidic medium, wherewith a solution of copper ions $Cu^{2+}$ and a non-dissolved residual second ash is obtained, the second ash being separated from the solution according to the separation of the non-dissolved residual second sludge from the solution, wherewith a solution of $Cu^{2+}$ ions in the acidic medium is obtained, said solution being subject to electrolysis according to the electrolysis of the solution of copper ions $Cu^{2+}$ in the acidic medium.

3. The method according to claim 2, characterized in that the first ash, after having been thermally treated, is added to the first sludge obtained from the separation of the first sludge from the suspension, the method then continuing according to the dissolution of the first sludge in the acidic medium, the separation of the non-dissolved residual second sludge from the solution, and the electrolysis of the solution of copper ions $Cu^{2+}$ in the acidic medium.

4. The method according to claim 1, characterized in that the washing additive is NaOH.

5. The method according to claim 4, wherein a concentration of the NaOH in the water is 2%.

6. The method according to claim 1, characterized in that the washing of the waste nets in the washing solution is carried out by friction.

7. The method according to claim 1, characterized in that the mineral acids are selected among $H_2SO_4$ or $HNO_3$ or HCl or a mixture of $HNO_3$ and HCl.

8. The method according to claim 1, characterized in that the acidic medium is $H_2SO_4$ with a concentration from and including 0.5 up to and including 4 M, the temperature is room temperature, dissolution time is 3 hours, dissolution yield is between 50 and 95%, wherein a solution with a concentration of copper ions $Cu^{2+}$ of at least 40 g/L is obtained.

9. The method according to claim 8, wherein a concentration of the $H_2SO_4$ is 1 M.

10. The method according to claim 1, characterized in that, if the concentration of copper ions $Cu^{2+}$ is less than 40 g/L, the concentration is increased to at least 40 g/L by using $Cu^{2+}$ ion selective ion exchangers.

11. The method according to claim 1, characterized in that prior to the electrolysis the solution of copper ions in the acid is filtered by filtration with active carbon, wherein organic substances are removed from the solution.

12. The method according to claim 1, characterized in that the electrolysis is carried out at an initial current density of at least 500 A/m², which is reduced gradually to 200 A/m² based on the quantity of the deposited copper, in a temperature range from 0 to 95° C., and elementary copper with a purity of at least 94% is deposited on the cathode.

13. The method according to claim 1, wherein the other impurities include at least one of paraffins and copolymers.

14. The method according to claim 1, wherein the antifouling coating includes at least one of paraffins and an EVA co-polymer.

15. A method for recovering copper from waste nets protected by copper-based antifouling coatings, the method comprising:

performing one of washing the waste nets and thermally treating the waste nets, the washing including washing of the waste nets in a washing liquid containing between 80 to 100% of water and between 0 to 20% of a washing additive, wherein a result of the washing is a suspension of a washing liquid, a first sludge and other impurities, wherein the first sludge contains copper compounds in the form of $Cu_2O$, $CuO$ and $Cu_2Cl(OH)_3$, impurities and rests of the antifouling coating, and the thermally treating including thermally treating the waste nets in a reactor, at a temperature ranging from 500° C. to 900° C. where all organic substances, such as paraffins, co-polymers and synthetic polymers, from which the waste nets are made, are removed;

separation of the first sludge from the suspension obtained from the washing of the waste nets in the washing liquid, wherein the first sludge, after the separation, comprises:
copper compounds in the form of copper oxides $Cu_2O$ and $CuO$ and copper oxychloride $Cu_2Cl(OH)_3$,
unseparated washing liquid, and
a rest containing impurities accumulated on the waste nets and residues of the antifouling coating;

dissolution of the first sludge in an acidic medium at temperatures ranging from 0 to 100° C. for 1 to 4 hours, wherein the acidic medium is a strong mineral acid, a mixture of strong mineral acids or a mixture of one or several strong mineral acids with $H_2O_2$, where the copper compounds contained in the first sludge get dissolved, wherewith a solution of copper ions $Cu^{2+}$ and a non-dissolved residual second sludge is obtained, wherein the concentration of copper ions $Cu^{2+}$ in the solution amounts to at least 20 g/L;

separation of the non-dissolved residual second sludge from the solution, wherewith a solution of $Cu^{2+}$ ions in the acidic medium is obtained, said medium representing an electrolyte that is then led to an electrolytic cell;

electrolysis of the solution of copper ions $Cu^{2+}$ in the acidic medium, obtained in the separation of the non-dissolved residual second sludge from the solution, in the electrolytic cell, where elementary copper gets deposited on the cathode; and processing ash including the copper compounds in the form of copper (II) oxide $CuO$, copper(I) oxide $Cu_2O$ and copper phosphates $Cu(H_2PO_4)_2$, $Na_6Cu_9(PO_4)_8$ which remains after the thermal treatment, according to the dissolution of the first sludge in the acidic medium, the separation of the non-dissolved residual second sludge from the solution, and the electrolysis of the solution of copper ions $Cu^{2+}$ in the acidic medium.

16. A method of recovering copper from waste nets, protected by copper-based antifouling coatings the method comprising:

leading the waste nets to thermal treatment in a reactor;

removing, at a temperature ranging from 500° C. to 900° C., all organic substances from which the waste nets are made, thereby obtaining a first ash remaining after the thermal treatment that contains copper compounds in the form of copper (II) oxide $CuO$, copper(I) oxide $Cu_2O$ and copper phosphates $Cu(H_2PO_4)_2$, $Na_6Cu_9(PO_4)_8$;

dissolution of the first ash in an acidic medium at temperatures ranging from 0 to 100° C. for 1 to 4 hours, wherein the acidic medium is one of a strong mineral acid, a mixture of strong mineral acids, and a mixture of one or several strong mineral acids with $H_2O_2$, where the copper compounds contained in the first ash get dissolved, wherewith a solution of copper ions $Cu^{2+}$ and a non-dissolved residual second ash is obtained, wherein the concentration of copper ions $Cu^{2+}$ in the solution amounts to at least 20 g/L, said solution of copper ions $Cu^{2+}$ and the non-dissolved residual second ash is led to the separation of the non-dissolved residual second ash from the solution, wherewith a solution of $Cu^{2+}$ ions in the acidic medium is obtained;

leading said solution representing an electrolyte to an electrolytic cell; and performing electrolysis of said solution of copper ions $Cu^{2+}$ in the acidic medium in the electrolytic cell, where elementary copper gets deposited on the cathode.

* * * * *